United States Patent
Atkinson et al.

(10) Patent No.: US 8,494,934 B2
(45) Date of Patent: Jul. 23, 2013

(54) ELECTRONIC SYSTEM FOR PROVISION OF BANKING SERVICES

(75) Inventors: Steven Paul Atkinson, Richmond (GB); Alastair David Lukies, Hertfordshire (GB)

(73) Assignee: Monitise Limited (GB)

( * ) Notice: Subject to any disclaimer, the term of this patent is extended or adjusted under 35 U.S.C. 154(b) by 1271 days.

(21) Appl. No.: 11/288,752

(22) Filed: Nov. 28, 2005

(65) Prior Publication Data
US 2006/0136334 A1 Jun. 22, 2006

(30) Foreign Application Priority Data

Nov. 29, 2004 (GB) .................................... 0426076.6

(51) Int. Cl.
*G06Q 40/00* (2012.01)

(52) U.S. Cl.
USPC .......................................................... 705/35

(58) Field of Classification Search
CPC ..................................................... G06Q 40/04
USPC ................... 705/16, 17, 4, 64, 39, 14, 34, 35, 705/42–44; 709/224, 246, 229, 328; 455/41, 455/433
See application file for complete search history.

(56) References Cited

U.S. PATENT DOCUMENTS

| | | | | |
|---|---|---|---|---|
| 5,025,373 A | * | 6/1991 | Keyser et al. | 705/42 |
| 5,157,717 A | * | 10/1992 | Hitchcock | 379/93.19 |
| 5,577,102 A | * | 11/1996 | Koivunen | 455/433 |
| 5,787,403 A | * | 7/1998 | Randle | 705/43 |
| 6,134,432 A | * | 10/2000 | Holmes et al. | 455/412.1 |
| 6,304,857 B1 | * | 10/2001 | Heindel et al. | 705/34 |
| 6,631,416 B2 | * | 10/2003 | Bendinelli et al. | 709/227 |
| 6,640,097 B2 | * | 10/2003 | Corrigan et al. | 455/414.1 |
| 6,643,625 B1 | * | 11/2003 | Acosta et al. | 705/38 |
| 6,850,991 B1 | * | 2/2005 | Young et al. | 709/246 |
| 6,934,689 B1 | * | 8/2005 | Ritter et al. | 705/17 |
| 7,203,845 B2 | * | 4/2007 | Sokolic et al. | 713/194 |
| RE39,736 E | * | 7/2007 | Morrill, Jr. | 705/44 |
| 2001/0005840 A1 | * | 6/2001 | Verkama | 705/67 |
| 2001/0021915 A1 | * | 9/2001 | Cohen et al. | 705/14 |
| 2001/0037415 A1 | * | 11/2001 | Freishtat et al. | 709/328 |

(Continued)

FOREIGN PATENT DOCUMENTS

| | | |
|---|---|---|
| JP | 2003-108783 | 4/2003 |
| WO | WO 96/13814 | 5/1996 |

OTHER PUBLICATIONS

No author, Using IPSEC in Tunnel Mode, MicrosfotTechNet, Mar. 28, 2003.*

(Continued)

*Primary Examiner* — Ella Colbert
(74) *Attorney, Agent, or Firm* — Blakely, Sokoloff, Taylor & Zafman

(57) ABSTRACT

An electronic system providing banking services, comprises a server having a first interface for communication with user mobile telephony devices over a mobile telephone network; and a second interface for communication with an intermediary acting as a gateway to banking records of multiple banking organizations. The first interface is adapted to allow at least balance enquiry requests to be submitted to one of the multiple banking organizations by means of the intermediary and to provide at least balance enquiry replies for display on the user mobile telephony device. The invention provides the functions of the high street ATM using the mobile phone environment.

15 Claims, 12 Drawing Sheets

U.S. PATENT DOCUMENTS

| | | | |
|---|---|---|---|
| 2002/0029174 A1* | 3/2002 | Shimura | 705/26 |
| 2002/0133605 A1* | 9/2002 | Khanna et al. | 709/229 |
| 2002/0184150 A1* | 12/2002 | Wong et al. | 705/42 |
| 2003/0004891 A1* | 1/2003 | Van Rensburg et al. | 705/64 |
| 2003/0114106 A1* | 6/2003 | Miyatsu et al. | 455/41 |

OTHER PUBLICATIONS

Nelson, Matthew G.; "Wireless goal: Don't get whacked"; Informationweek, n845; Jul. 9, 2001; pp. 1-2.*

PR Newswire; "NetBank(R) Launches 24×7 Wireless Banking Services Via Cell and WAP Phones or Palm VII(TM)"; Sep. 12, 2000; p. 1.*

Nelson, Matthew G.; "Wireless Goal: Don't Get Whacked—Companies work to keep hackers out of their wireless networks. (whacking=wireless hacking)9Industry Trend or Event)"; InformationWeek; Jul. 9, 2001; pp. 1-2.*

* cited by examiner

1. Customer learns of mobileATM™ through marketing campaigns
2. Customer registers for mobileATM™ through PC or mobile handset
3. One off password is sent to customer by post
4. Customer uses mobileATM™

⑥

⑦

⑧

⑨

⑥ ⑦ ⑧

⑨ ⑩ ⑪

ELECTRONIC SYSTEM FOR PROVISION OF BANKING SERVICES

This invention relates to the provision of banking services. In particular, the invention relates to electronic banking services of the type currently provided by automatic telling machines (ATMs), such as balance enquiries.

The ATM was introduced primarily to reduce the number of tellers required in a branch of a retail bank by providing consumers an automated interface to traditional teller functions such as deposit and withdrawal services. By introducing automation, the ATM has enabled the retail banking industry not only to achieve a reduction in operating costs, but also enabled the industry to maintain a high level of customer service in an increasingly available 24 hour high street without requiring large amounts of investment.

For example, it is possible for a retail bank in the UK to offer their customers access to over 40,000 ATMs in the UK high street without, in theory, having any costs associated with managing an ATM estate.

With over 94 million supported cards in UK circulation the ATM has now become widely accepted by consumers on a global scale. In addition to withdrawal and deposit functions, ATMs allow balance enquiries to be carried out, statements to be viewed, as well as an increasing number of additional functions. These additional services relating to account management rather than cash withdrawal are increasingly in demand. ATMs are, however, in fixed locations and do not offer the flexibility demanded by customers.

On-line banking and saving systems offer the additional flexibility for the user to perform all of the required tasks at home, on a home PC. These banking services may allow a much wider range of functions to be carried out, including payment of bills, balance enquiries, balance transfers between accounts etc. Whilst this form of banking provides the additional flexibility (in terms of both time and location) demanded by customers, the use of the internet as the data transfer platform poses security concerns, and many customers are unwilling to use internet based banking services for this reason.

There remains a need, therefore, for the delivery of banking services in a secure environment but with location and timing flexibility.

SUMMARY OF THE INVENTION

According to the invention, there is provided an electronic system providing banking services, comprising a server having:
- a first interface for communication with user mobile telephony devices over a mobile telephone network; and
- a second interface for communication with an intermediary acting as a gateway to banking records of multiple banking organisations,
- wherein the first interface comprises:
  - receiving means adapted to receive at least a balance enquiry request from a user mobile telephony device; and
  - transmitting means adapted to provide a balance enquiry reply to a user mobile telephony device for display on the user mobile telephony device,
- and wherein the second interface comprises:
  - transmitting means adapted to transmit a received balance enquiry request to the intermediary, for re-transmission by the intermediary to one of the multiple banking organisations; and
  - receiving means adapted to receive a balance enquiry reply from the intermediary.

The invention is based on the recognition that some of the Teller functions of the high street ATM can be made more accessible by extending the service to the mobile phone environment. The first interface is adapted to allow at least balance enquiry requests to be submitted to one of the multiple banking organisations by means of the intermediary and to provide at least balance enquiry replies for display on the user mobile telephony device.

The first interface preferably also enables funds transfer requests to be submitted to one of the multiple banking organisations. This can enable PIN-concurred peer-to-peer and peer-to-enterprise transfers. In this case, the source bank will be instructed to transfer funds to a specified destination account.

The first interface is can be for communication with SIM card and Java mobile telephony devices. Preferably, the system can operate as a cross bank, cross mobile operator banking service. This environment enables access to services of any Bank, using any Operator and any Handset, The first interface preferably includes a personal identification number security system. This provides an additional level of security over the existing security of the mobile network, which already implements security based on the SIM card of the user. PIN Block 3DES encryption may be used.

The first interface may further include an LTS encryption system.

The invention also provides a method of providing a banking service, comprising:
- receiving a request for the banking service from a user operating a mobile telephony device by selecting options displayed on screen;
- processing the request and communicating with an intermediary acting as a gateway to banking records of multiple banking organisations including a banking organisation of the user; and
- providing the response to the request over the mobile telephony network for display on the user mobile telephony device.

This method provides the display of information on a mobile device, in such a way that ATM functions can be implemented on a mobile device, thereby adding location freedom to these functions, but without compromising security through the use of a PC internet based system.

Preferably, before allowing a user access to the banking service, a registration procedure is implemented. The registration procedure can take account of the identity of the mobile telephony device, a passcode provided by the user and the address of the user.

The banking service may include account balance enquiry, mobile telephone account top-up and many other services relating to electronic (rather than paper) commerce.

BRIEF DESCRIPTION OF THE DRAWINGS

Examples of the invention will now be described in detail with reference to the accompanying drawings, in which.

DETAILED DESCRIPTION

Figure 1:
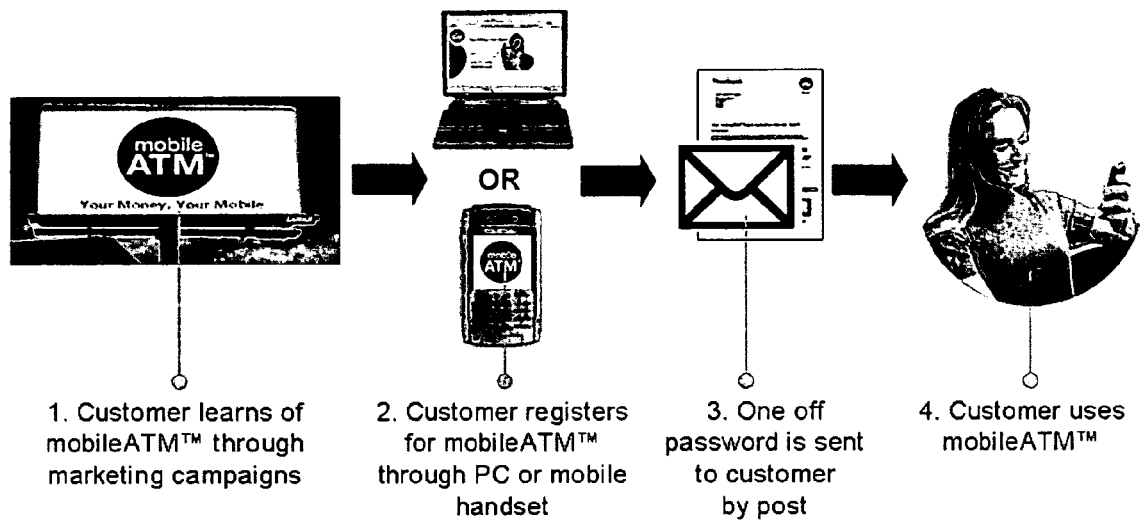
FIG. 1 shows the preferred registration procedure for the system of the invention.

The invention will now be described from two perspectives. Firstly, an overview of the services implemented by the system will be provided in terms of the service from a consumer, retail bank and mobile operator viewpoint. A technical Overview will then follow, in the form of a detailed overview of the technical components that form the service.

In essence, the system of the invention can be seen as a service enabling consumers to have secure access, directly from their mobile phone, to a range of common and well understood account transaction facilities. However, unlike other mobile banking services, the core principles do not differ from the core principles for the original introduction of ATMs; pragmatically introducing automation to specifically drive down operating costs and at the same time retain and increase customer service.

In the following sections the service is described in further detail primarily from a consumer's viewpoint but also from a retail bank and mobile operators' viewpoint.

The system is intended for use by any Consumer, and is intended to be understood by any consumer. In particular, the system provides an implementation of the Teller metaphor that has been accepted for over thirty years. It has now become an intuitive experience for the majority of the population.

The security issue mentioned above in connection with internet based banking systems is addressed through the use of the same trusted operator of the ATMs. In the UK, LINK (trade mark) is recognised as a trusted provider of secure transaction services with strong brand recognition (92% in UK adults). The implementation of the system in the UK is thus proposed as a partnership with an ATM operator, such as LINK (trade mark), This is a key component for gaining the first level of a customers trust-security. As will be shown below, the service cam be implemented with banking level security.

The system can be implemented by initially introducing useful low risk transaction services such as balance enquiry, and mobile phone top-up services This can enable usage to gradually become habitual and therefore enable further services to be introduced.

There were over 90 million balance enquiry transactions across the LINK ATM switch in 2003. The system of the invention provides a more accessible and real time service for consumers that use these facilities from fixed ATMs. Over time these transaction types will be extended with pragmatic, and required, electronic money management transaction types.

How a consumer gains access to the service and how a consumer subsequently uses the service is described in the following sections.

Consumer Registration

For security reasons it is necessary for consumers to register for the service. This is achieved in one of two ways; by registering via the service web site or registering for the service directly from a mobile phone. An overview of the registration processes is given in FIG. 1, which shows how a customer uses the service. In the figures and text below, the term "mobileATM™", is used, and this denotes the service/system of the invention.

FIG. 1 shows the four stages required to use the service. In stage 1, the customer becomes aware of the existence of the service. In stage 2, there is a registration process, and the subsequent stage involves a password being sent to the use by post. This provides a link between the IP address or mobile identity of the user and the postal address, and thereby provides an additional level of security over the simple anonymous use of a PC or mobile telephone. After this registration process, in stage 4, the customer is able to use the service.

Using the Service

Once registered, consumers can then begin to use the service and do so by navigating to the applications menu on their phone and executing the application.

Figure 2:
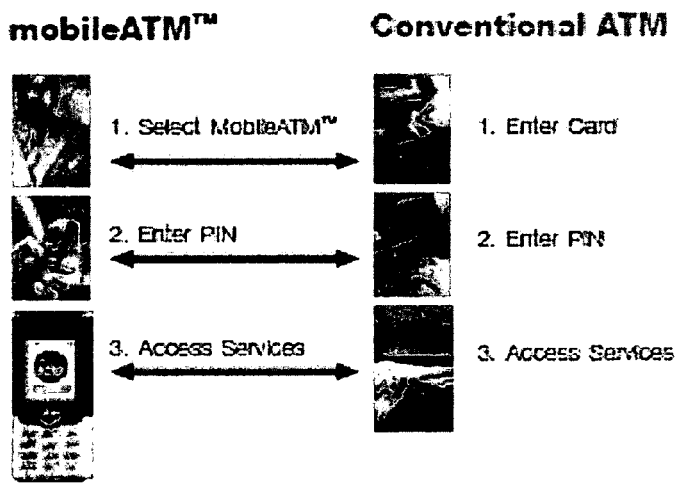
FIG. 2 shows a comparison of the system of the invention and a conventional ATM function from the users point of view.

In a similar fashion to a physical ATM, the user will be required to enter a numeric code, or Passcode, which forms part of the identification process, as shown in FIG. 2.

FIG. 2 shows the system of the invention is analogous to the use of an ATM, with the only difference being the selection of the service from a mobile telephone rather than the insertion of a bank card into the ATM.

Once authenticated by the service, the consumer will be able to choose from a number of registered accounts or choose to register further accounts to be used against the service. Each account registered has a number of supported transactions that can be executed against the chosen account. Initially the service will be launched with a balance enquiry and mobile phone top-up service, and these are further discussed below.

Balance Enquiry Transaction

Figure 3:
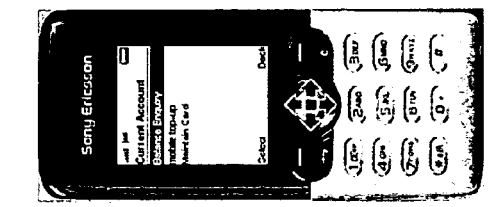
FIG. 3 shows the steps performed by a user to make a balance enquiry.
Figure 3:
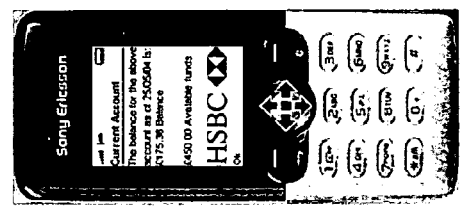
Figure 3:
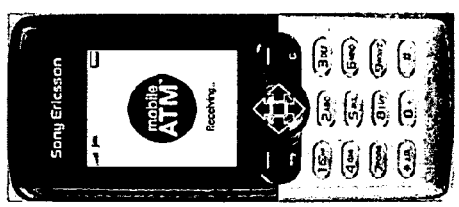
Figure 3:
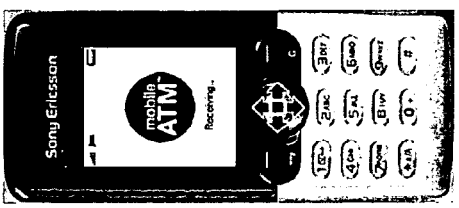
Figure 3:
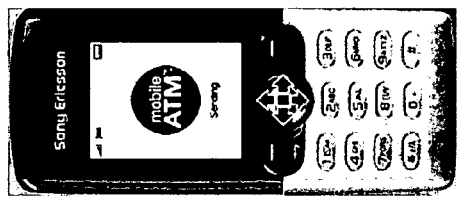
Figure 3:
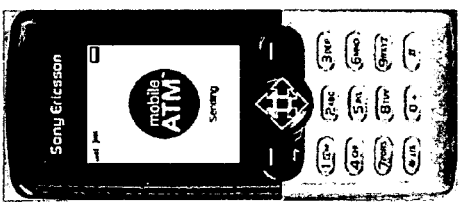
Figure 3:
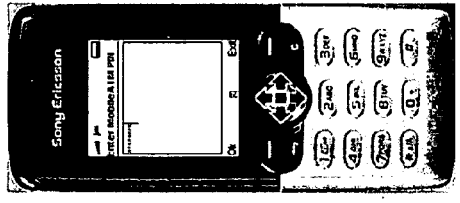
Figure 3:
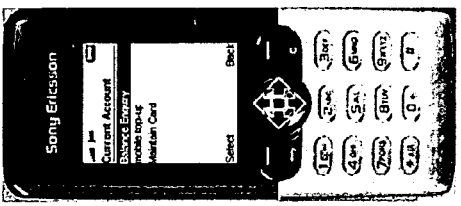
Figure 3:
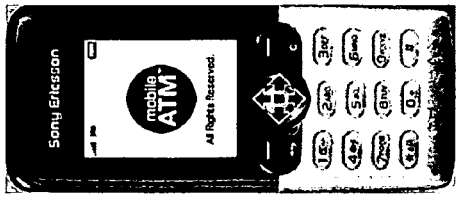
Figure 3:
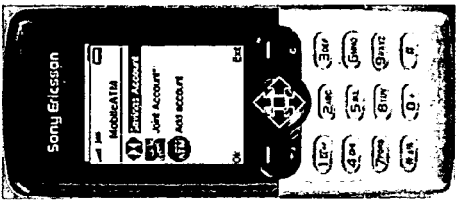

An overview of the balance enquiry user experience is given in FIG. 3. The ten images in FIG. 3 show the following operations:

1. The customer locates the service and starts the service.
2. The customer enters their passcode (which they had received by post).
3. The passcode is encrypted and transmitted securely for verification by the client application.
4. Identity verification is received from the server and displayed.
5. A list of registered accounts is displayed and the customer is able to navigate through the list, using the normal handset buttons, to choose the account of interest.
6. A list of supported transactions against the chosen account is displayed and using the handset select key the customer can choose the balance enquiry transaction type.

7. The transaction request is transmitted securely for processing to the server.
8. The balance enquiry result is received from the server.
9. The balance is then displayed on the screen as it appears on the physical ATM.
10. Finally the user is automatically navigated back to the account transaction screen.

Mobile Phone Top-Up Transaction

Figure 4:
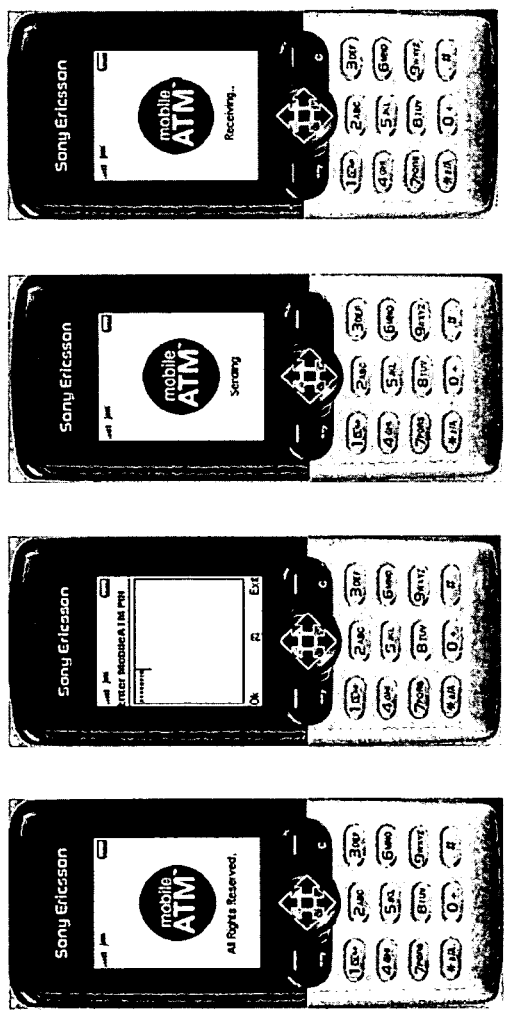
FIG. 4 shows the steps performed by a user to make a mobile phone top-up.
Figure 4:
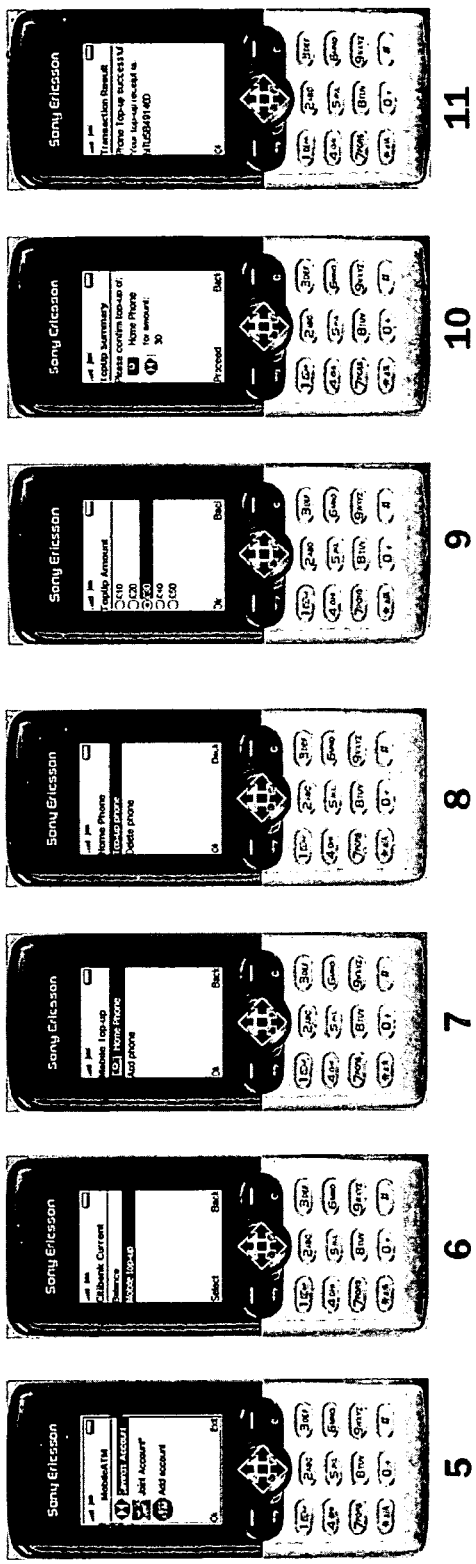

An overview of the mobile phone top-up transaction is given in FIG. 4 The eleven images in FIG. 4 show the following operations:
1. The user locates the service from their phone menu and executes the mobileATM™ application.
2. The customer enters their passcode
3. The passcode is encrypted and secure transmitted to the server for verification.
4. Once verified the result is received from the server.
5. A list of registered accounts is displayed for the user to select from.
6. To top-up a phone the user chooses the mobile top-up transaction from the transaction menu.
7. The customer chooses from a list of registered mobile accounts to top-up. A phone account is registered simply choosing the register phone menu option and entering the phone number, choosing the relevant service provider from a list and entering an alias to remember the account.
8. To top-up the account the user chooses the top-up menu option. It is noted that this menu level will be extended to provide further teller services for the mobile account—for example if the operator offers stored value functionality in order to address e-money regulations.
9. From a list of values the user chooses the required amount to top-up the mobile phone account.
10. A confirmation of the transaction is displayed to the customer for acceptance. Once confirmation is received the transaction is transmitted to the server for processing. The processing includes splitting the transaction into a withdrawal from the source bank account or credit card and a deposit into the relevant pre-pay account.
11. Finally a confirmation, including receipt, is displayed on the screen. It is noted that mini-statement functionality will include the ability to retrieve a receipt number at a later date.

FIGS. 3 and 4 thus illustrate the ease of use of the system from the point of view of the customer.

From the point of view of the banking industry, the service can be made available to all members of the ATM operator (for example LINK (trade mark) Interchange Network for the UK, and which results in the service supporting 94 million cards in the UK). LINK (trade mark) is an example of membership scheme which offers members a number of services, and these services can be extended to include the mobile service of the invention. Thus, each retail bank will have the option of supporting the service.

The service of the invention also addresses the key concerns of the retail bank industry in the following ways:
1. Is the service secure?—The use of mobile telephony can be adapted provide a secure environment with similar levels of security as the physical ATM.
2. How much does the service cost?—in line with the core reasons for introducing the original ATM, the service of the invention requires only minimal levels of investment and not only will the service lower operating costs but also provide a new revenue stream from traditionally non-revenue generating services such as balance enquiries and new revenue streams by extending services such as mobile phone top-ups.
3. Is the service competitive?—the invention provides a mobile phone implementation of the Teller metaphor. The Teller metaphor is a representation of standard banking transactions and therefore enables the retail bank to make their customer service even more accessible. The invention also provides, like the high street ATM, a flexible foundation for an individual bank to develop compelling services for their customers enabling them to remain competitive over the mobile channel and without requiring large amounts of investment.

From the mobile operator's viewpoint, the service is based upon global telecommunication standards and therefore can be made available from every mobile phone in the UK. The service of the invention thus also addresses the key concerns of the mobile phone industry in the following ways:
4. Does it increase data services?—providing a more accessible access channel for an existing service will result in some new uptake; the mobile operators have proved this beyond doubt through effectively replacing the payphone network with a more expensive, but more accessible channel.
5. Is it a competitive service?—Using the same principles of introducing automation to reduce costs of maintaining a branch network, the service introduces automation to the pre-pay market resulting in large operational costs savings. The operators have already recognised the savings that would result by reducing transaction costs and introducing real time settlement for what has been estimated to be a £3 billion pound pre-pay market. A large take-up has already has been experienced with the recently introduced fixed line ATM mobile phone top-up service.

In summary, the service of the invention enables users to have secure real time access to a number of financial transaction services via a known user interface design—a mobile phone implementation of the ATM.

For retail banks, the service enables them to exploit the original principles for the introduction of ATMs; the reduction in operating costs by the introduction of pragmatic automation of teller services. The service also enables retail banks to offer tailored services enabling retail banks to remain competitive across the mobile channel without large investment.

For mobile operators the service provides a new data service, increasing data ARPU (average revenue per user). It also enables the mobile operating community to dramatically reduce operating costs for managing pre-pay customers by providing standard teller services such as deposit against a consumer's pre-pay account.

A technical description of one preferred implementation of the system of the invention follows.

In one preferred implementation, the service is designed as a component based service utilising standard object oriented analysis, design and programming techniques. More specifically the service can be designed against J2EE (Java 2 Enterprise Edition) standards and best practice techniques. The system is intended to at least replicate if not improve the security of the high street ATM.

Figure 5:
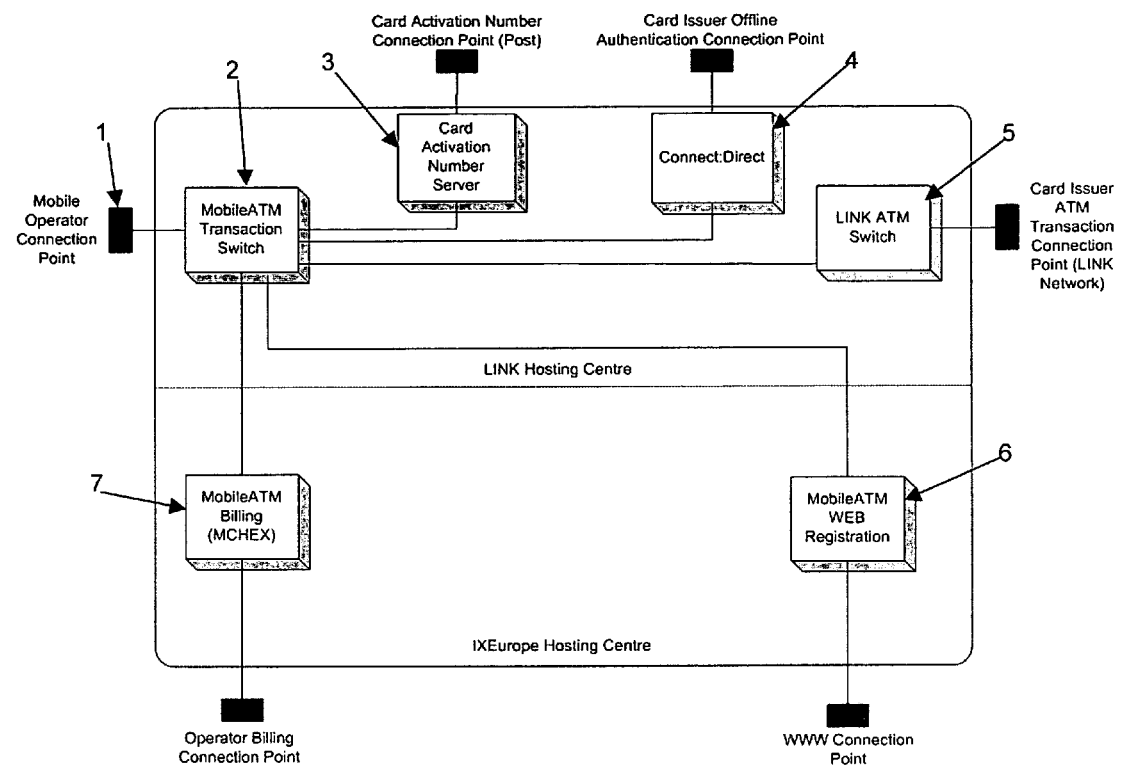
FIG. 5 shows schematically an example of system of the invention.

A high level component diagram is shown in FIG. 5. The "mobile operator connection point" 1 is the interface between the mobileATM server and the mobileATM client components. The "mobileATM transaction switch" 2 provides the transaction server and some security components for the system. The "card activation number server" 3 provides the mechanism to fulfil part of the security model—the confirmation of a consumer's address by physically sending a card activation number printed on the relevant security stationary. The "connect:direct" component 4 provides the necessary address check functionality with the card issuer. The "LINK ATM switch" 5 forms the interface for secure transactions to the member banks over the LINK network. The "mobileATM web registration" component 6 provides the necessary functionality to complete web registration and the "MoibileATM billing" engine 7 provides the mechanism to charge for individual transaction types against the consumers mobile phone account.

The service is divided into the following components:
  Client components
  Transaction server components
  Enterprise Integration components Greater detail of these components is given in the following sections which also includes an overview of the network connectivity of the service.

Client Components

The mobileATM™ client component is the client tier of the overall mobileATM™ service and to ensure the maximum number of consumers supported at launch. Two different basic types of client are supported:
  a SIM card based client; or
  a Java based client.

This client strategy ensures that the service can support over 50 million mobile phone users in the UK independent of individual user's handset capabilities.

SIM Based Client

The Subscriber Identity Module (SIM) is a chip card inserted into a mobile handset that is the key element to over 863.6 million GSM subscribers, representing over 72% of the global mobile phone market. The purpose of the SIM is to store subscription information and provide authentication between subscriber and mobile service provider whether at home or roaming abroad. One of the key developments in the evolution of the SIM card has been the introduction of SIM Toolkit (STK) which has now been incorporated into global telecommunication standards.

The STK enables SIM resident applications to be developed which access to appears on the handset as menu items. Essentially the STK enables mobile operators to send commands to the SIM ranging from displaying menus, getting user input and sending and receiving Short Messages (SMs). A further development in STK is the standardisation of a SIM based micro-browser which offers application developers a simple platform to develop secure SIM based applications that are handset agnostic. The micro-browser or Wireless Internet Browser (WIB) was developed and standardised specifically to enable application developers a SIM resident WML (Wireless Mark-Up Language) interpreter which has access to SIM memory and offers a true interoperable execution environment within the SIM.

Figure 6:
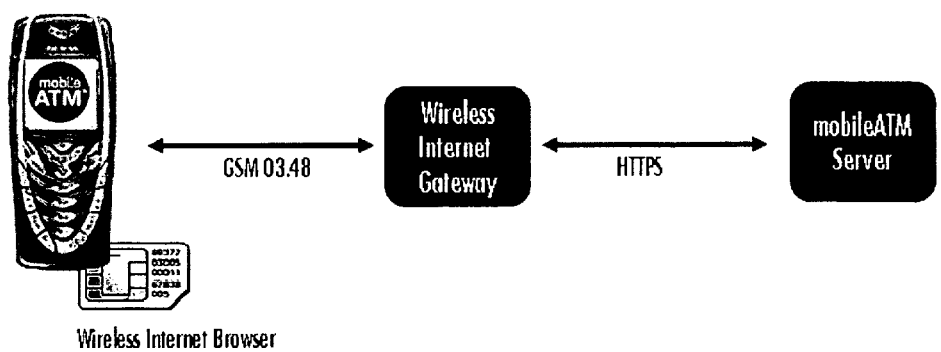
FIG. 6 shows in more detail a first example of interface between a user and the server of the system of the invention.

An overview of the main components of the interaction with a SIM client is given in FIG. 6.

Initially, the User requests the mobileATM™ service from the menu, and the SIM creates a request for the mobileATM™ service which is encoded into byte code and transmitted to the WIG (wireless internet gateway) using the SM (short messaging) protocol.

The WIG accepts the request and translates the byte code into a standard URL request and forwards the request to the mobileATM™ server.

The mobileATM™ server processes the request, in this case the generation of the user specific ATM menu. The content to return is represented in Wireless Mark-up Language and transmitted back to the WIG.

The WIG encodes the WML into byte code and transmits the content to the WIB for displaying on the phone using the SM protocol.

The user may choose to issue a transaction which repeats this flow of events.

The WIB (wireless internet browser) content, in WML form, is generated dynamically for each individual user request by the web tier components of the transaction engine.

In order to implement the security requirements of the system the SIM client utilises the standard security plug-ins provided by the SIM card manufacturer. Depending on SIM usage, two security models have been created based on PIN encryption system. SIM usage factors included the period of time a SIM has been used and the mobile operators internal key management procedures.

PIN Encryption Model One

The existing SmartTrust 3DES (Triple Data Encryption Standard) plugin has the following function signature:
  *DE(KeyIdentifier, Options, PlainText)
  Where:
Key Identity—identifies the key to be used for the operation
Options—to specify a number of options for the operation
Plaintext—the text to be used for the operation For the first implementation option, the key identity would be used to identify the resident key to use for the encryption, the options would denoted a 3DES operation and the plain text would be the PIN and padding information to be encrypted.

PIN Encryption Model Two

A further enhancement to the PIN encryption uses a modification to the standard plugin as follows:
  *DE(KeyIdentifier, Options, PlainText, Working Key)
  Where:
Key Identity—identifies the key to be used for the operation
Options—to specify a number of options for the operation
Plaintext—the text to be used for the operation
Working Key—the encrypted PIN to be used for the encryption The pseudo code for the function is as follows:
//Decrypt the working key
key=decrypt(keyIdentifier, working Key)
//Encrypt the Plain Text
return(encrypt(key, options, plaintext))

This implementation enables a working key to be generated on the server side for a MobileATM session and transmitted securely to the handset when the user requests the service.

Java Based Client

Figure 7:
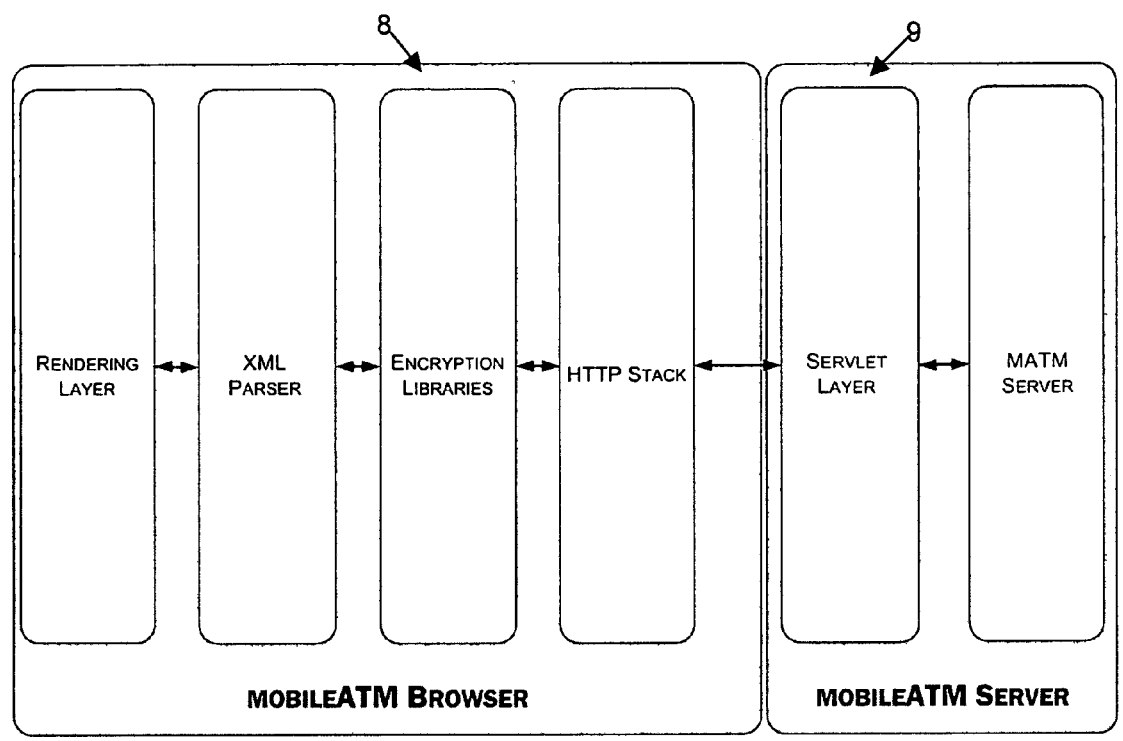
FIG. 7 shows in more detail a second example of interface between a user and the server of the system of the invention.

The mobileATM™ Java client has been designed to be supported by the majority of Java enabled handsets including MIDP 1.0 and MIDP 2.0 handsets. FIG. 7 shows the MobileATM browser 8 and the MobileATM server 9. As shown in FIG. 7, the mobileATM™ Java client (the mobileATM browser 8) has been designed essentially as a secure browser architecture which includes the following main components:
  Rendering layer
  XML Parser
  Encryption libraries
  HTTP Stack.

These are discussed below:
Rendering Layer

As with the SIM client, content is generated dynamically using a mark-up language as a result of a request from a Java client by the web components of the transaction server. Content for the Java client utilises a specific extension to the WML standard termed MATML (Mobile ATM Mark-up language) which is rendered on the handset screen by the rendering layer. The rendering layer maintains static references to the current 'page' or menu screen and also the business logic for maintaining state, cache management and default commands used to navigate the mobileATM™.

Cookies are employed by the transaction server to maintain client state. The Java client saves cookies in their entirety except for path or expiry attributes. The client does however, store, and return cookies by hostname.

To improve consumer experience the Java client maintains a dynamic cache of recent pages or menu items for the mobileATM™ service. The mechanism for the Java client cache is as follows:

When a page is requested by the user, essentially a link to another page, the rendering layer initially checks its internal cache to determine whether the page has been accessed recently. If there is no matching page, the URL is passed to the HTTP stack and a HTTP request is generated and transmitted over to the transaction server. When the HTTP request has been generated the client then determines whether the requested page should be added to the internal client cache.

When a forward or back command has been initiated by the consumer, the rendering layer determines whether the resulting page has been stored in the internal cache. If not the URL is passed to the HTTP stack and a request is formed and transmitted to the transaction server for processing.

The Java client has three default commands:

Forward—the rendering layer determines, from examination of the index of the current page, whether a forward command is valid. If valid then a keypress event handler is added to the current page for rendering.

Back—the rendering layer determines, from examination of the index of the current page, whether a back command is valid. If valid a keypress event handler is added to the current page.

Exit—the rendering layer adds an exit command to each page by default.

Executing an exit command performs the required clean-up before exiting the application.

XML Parser

The Java client parser enables the client to parse MATML information and create the necessary objects to be rendered on the handset screen.

Encryption Libraries

The mobileATM™ client has a Lightweight Transport Security (LTS) layer; this security layer provides an encryption tunnel between the client and the transaction server. The encryption tunnel is akin to an internet SSL session differs from SSL, however, since the LTS public key is embedded within the obfuscated client. This network security model was adopted due to the high levels of network latency associated with GPRS network data exchange. Further information is given in the end-to-end security overview later in this section.

HTTP Stack

The HTTP stack controls all of the HTTP communication between the client and transaction server.

Transaction Server Components

Figure 8:
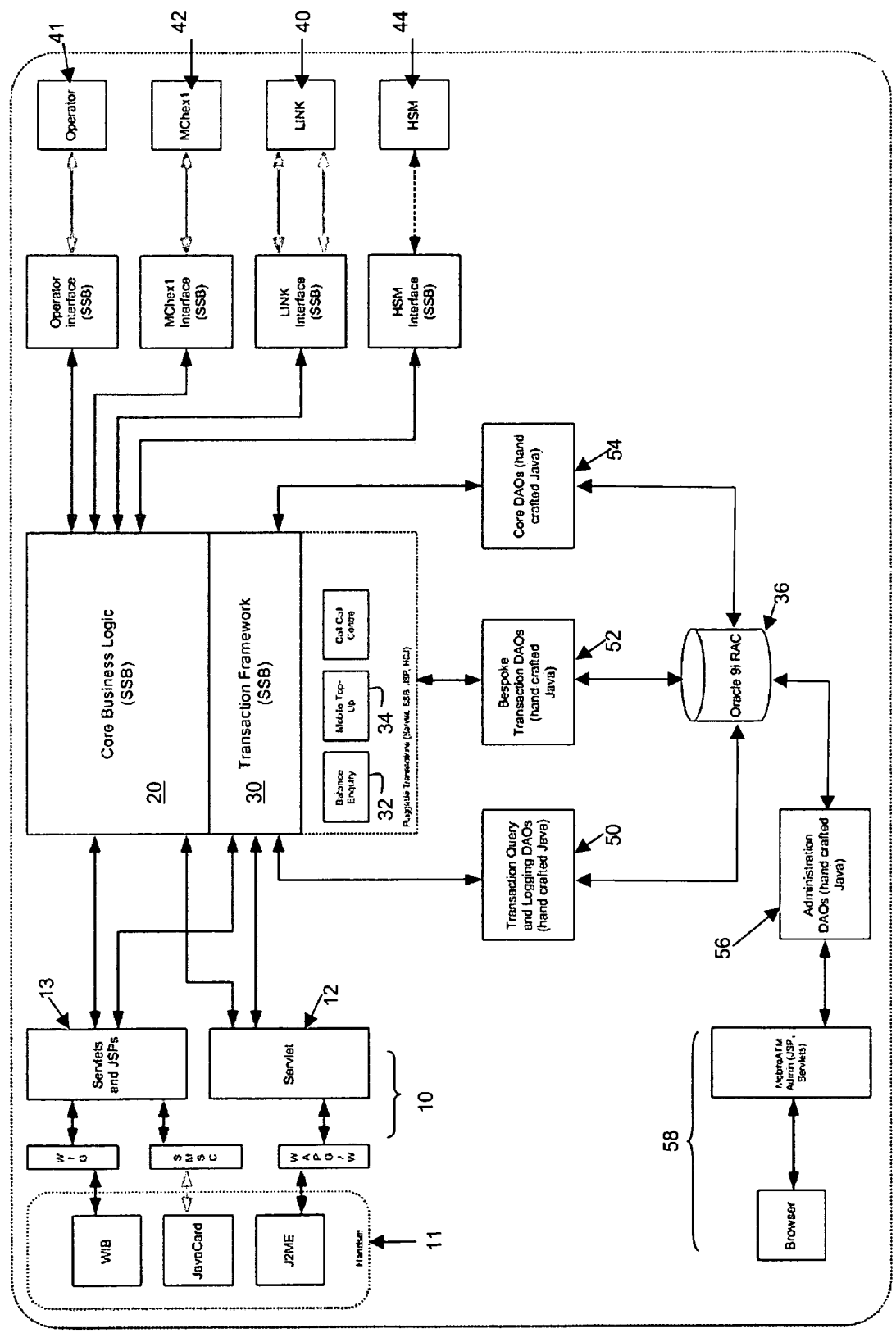
FIG. 8 shows in more detail than FIG. 5 an example of system of the invention.

A detailed component diagram of the mobileATM™ transaction server is given in FIG. 8 and for the purposes of this document the software architecture is described in terms of the:

Web tier component
Core business logic component
Transaction framework component.

The design follows object oriented design and programming best practices with separation of presentation tier, business logic tier and enterprise integration tier. These have been developed inline with the Java standard with the presentation tier being developed using a mixture of Java Sever Pages and Java Servlets. The business logic tier is implemented as a series of Java stateless session beans and the EAI components are developed inline with the Java Connector Architecture (JCA).

Some of the key components are described in more detail below followed by a discussion of the EAI (Enterprise Application Integration) components such as the LINK Interface, as well as the security issues.

Web Tier Components

The web component tier 10 comprises the necessary components required to manage the communication between a mobileATM™ client (the handset 11) and the mobileATM™ server. The web tier is a collection of servlets 12 and Java Server Pages (JSPs) 13.

Core Business Logic Components

The core business logic component 20 is further subdivided into the following sub-components:

Lightweight Transport Security—the secure communications protocol which is similar to SSL which is further described in the end-to-end security section.

Passcode Authentication—after establishment of an LTS session a further working key is generated to encrypt and validate the Passcode by:
The client generating a random key
Encrypting the key against the LTS working key
Transmitting the encrypted Passcode to the server web tier
Storing the working key for the user session After the user enters their Passcode the client encrypts the passcode against the LTS working key and transmits the encrypted Passcode to the web tier. The encrypted Passcode is then validated and the user is granted access to their services or an invalid Passcode message is displayed.

Session Management—the core business logic makes use of session management to maintain state between client requests Transaction Framework The transaction framework 30 manages the Teller transactions and individual transaction types are coded using stateless session beans (SSBs). The implementation of the transaction framework enables further transaction types to be supported without affecting the live running of the service. Initially the service will have the following transaction types:

Balance Enquiry—the balance enquiry SSB 32 interacts with the LINK integration component to executes the necessary business logic for a balance enquiry transaction Mobile Phone Top-Up—the top-up SSB 34 interacts with the LINK integration component to executes the necessary business logic for a mobile phone top-up transaction.

Enterprise Application Integration Components

To ensure that the server can be extended in the future, for example to support different geographical regions, the Enterprise Application Integration (EAI) components have been implemented using the standard Java Connector Architecture (JCA). The following EAI components have been implemented for the service:

LINK JCA 40—composed of an SSB and Service implementation. The functionality exposed by the LINK JCA is as follows:

Balance enquiry—forms the relevant LIS5 transaction encoding, transmits the transaction and routes resulting reply back to the transaction framework.

Mobile phone top-up—forms the relevant LIS5 transaction encoding, transmits the transactions and routes the resulting reply back to the transaction framework.

Operator JCA 41—for operator interface to the system.

MChex JCA 42—composed of an SSB and Service implementation. The functionality exposed by the MChex JCA is as follows:

Send an SMS message to an MSISDN (mobile station ISDN) which includes message body and operator specification Send a binary message to an MSISDN which includes binary message content and operator specification Send a WAP push message to an MSISDN which includes message text and operator specification Perform a billing request against an MSISDN which includes the price point and operator specification HSM (Hierarchical storage management) JCA 44—composed of an SSB and Service implementation. The functionality exposed by the HSM JCA is as follows:

Generate Passcode, used to generate Card Activation Numbers (CANs) and new random Passcodes Verify Passcode, used for authenticating users against a Passcode and used for activating cards against a CAN Generate Passcode or CAN offset, used for storing a Passcode against a user and used for storing a CAN against a card.

These JCA component each have respective interface components as shown.

FIG. 8 also shows a database 36 which is controlled by data access objects (DAOs), comprising transaction query and logging DAOs 50, bespoke transaction DAOs 52, and core DAOs 54. Administration DAOs 56 are controlled by means of a browser interface 58.

By way of example, the DAOs communicate with the database 36 using JDBC (Java Database Connectivity). The DAOs 50,52,54 communicate with the transaction framework 30 and SSBs 32,34 using a local protocol. The other communication channels to the Core business logic SSB 20 and Transaction framework SSB 30 use RMI/IIOP (Java Remote Method Invocation/Internet Inter-ORB Protocol). The communications between the SSB interfaces and the JCAs 40,41, 42,44 can use SOAP, although the LINK interface can additionally use LIS5 as mentioned above.

Different handset types communicate with the web component tier 10 using different protocols, for example SM OTA channel 03.48, SMS (short messaging service), GPRS (General Packet Radio Service). Within the web component tier 10, HTTP, SMTP, SMS2000 and XML may be used. Examples of different types of handset technology shown are WIB (wireless internet browser), JavaCard and J2ME.

End to End Security Model

Figure 9:
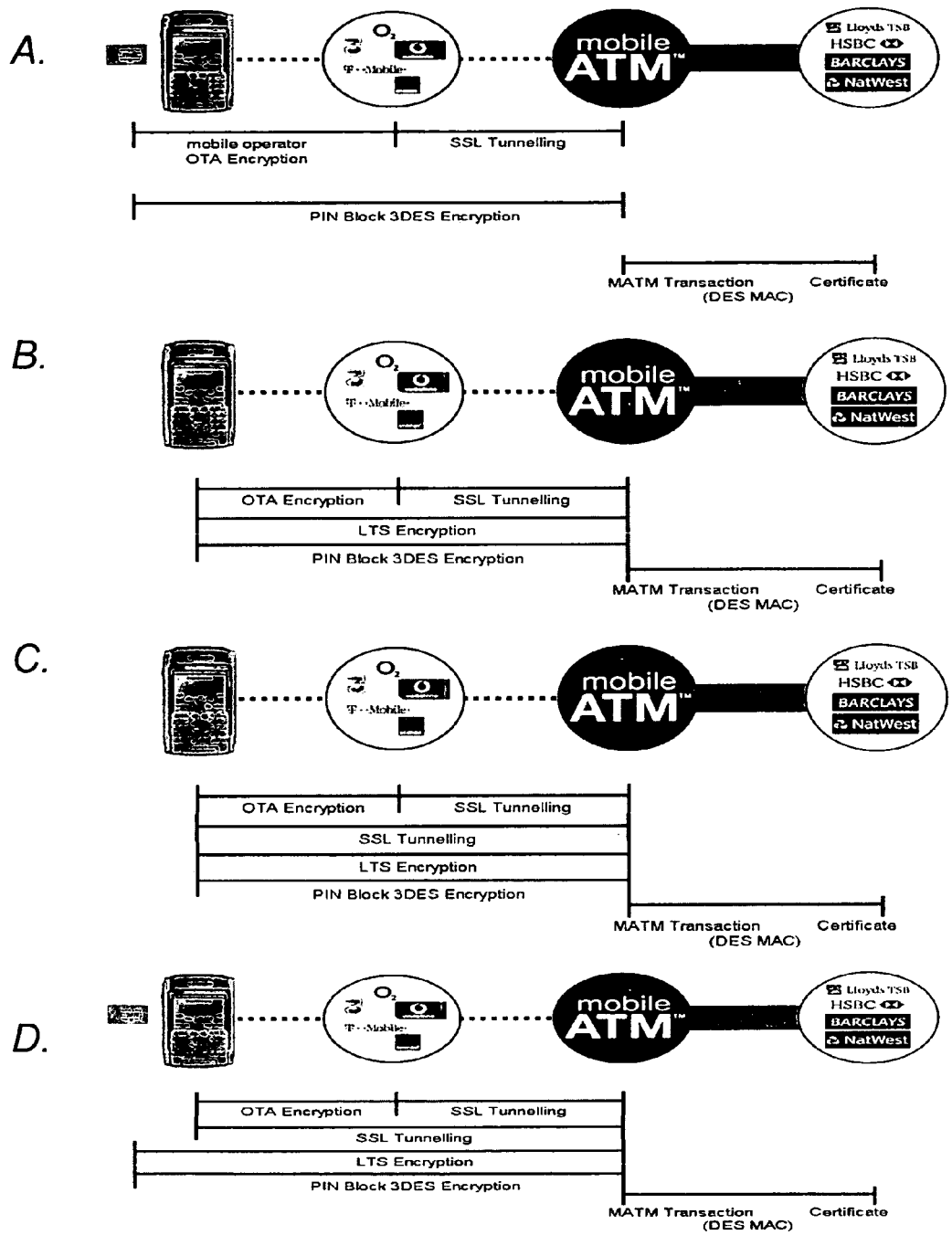
FIG. 9 shows four examples of different security layers present in the communications within the system of the invention.

The primary design consideration for the service is security, and as shown in FIG. 9, the service employs a multi-layer security model.

In FIG. 9, part A is an overview of Multi-Layer Security Layer for a SIM Client which shows that network level security is provided by the encryption of over-the-air traffic from the SIM card and the PIN encryption layer provides PIN Block 3DES level security for the PIN.

Part B is an overview of the Multi-Layer Security Model for an MIDP1.0 Client (Mobile Information Device Protocol), in which the security has been further improved to provide a mobileATM network level security in addition to the mobile network security level. This level provides a secure SSL like connection between the mobileATM handset application and the mobileATM server.

Part C is an overview of the Multi-Layer Security Model for a MIDP2.0 Client, in which the network security has further been enhanced by providing an SSL tunnel directly from the handset to the mobileATM server. This model is further enhanced to include signed application code to address man-in-the-middle attacks.

Part D is a further enhancement for a MIDP 2.0 client with JSR 177 Support. In this model, the encryption and decryption tasks are carried out within the SIM environment.

The server architecture enables the supported transactions to be dynamically generated in order to restrict the transaction types available for the different security models. For example, Part A may only be specified to support balance enquiry and pre-pay top up transactions where enhanced security models may support further transaction types as a result of the increased security provided.

As shown in FIG. 9, different client types allow different types of security protection. However in each case the minimum requirement is the PIN block encryption, which provides 3 DES PIN protection.

General security features of the service can include:

No customer bank card data is stored within the mobileATM™ client application.

No customer bank card data is stored within the handset memory.

Not enough bank card information is held by mobileATM™ at the server side to clone a bank card or to perform a Card Not Present Transaction.

The customer selects their own Passcode of between 5 and 12 numeric digits

The customer's mobileATM™ Passcode is longer in length and separate from the customers ATM PIN The mobileATM™ Passcode secures the entire mobileATM™ channel.

The messaging protocol employed by mobileATM™ is HTTP request/response.

The LTS (Lightweight Transport Security) encryption layer has the following attributes:

The LTS level encryption tunnel spans between the mobileATM™ client application and the mobileATM™ server.

The LTS tunnel prevents message insertion, removal, alteration or replay during transport between client and server which is achieved through 3DES encryption combined with message MACing techniques.

The mobileATM™ client and server contain custom encryption libraries to provide LTS level security.

The mobileATM™ LTS public key is stored in the obfuscated client and is 2048 bits in length.

The mobileATM™ LTS pair key has a maximum life of 24 months.

Multiple mobileATM™ LTS RSA key pairs can be active concurrently.

The PIN block encryption layer has the following attributes:

Passcodes are associated with the mobileATM™ customer ID to which they relate.

The Passcode offset value is an offset value from the Natural PIN generated from the customer ID using the mobileATM™ PVK.

The customer entered Passcode value is not shown on the handset screen during entry.

The Passcode value held by mobileATM™ is stored within the mobileATM™ database as a PIN offset value protected by the mobileATM™ PVK.

The mobileATM™ PVK is double length DES key.

The mobileATM™ customer will be given five consecutive attempts to correctly enter their Passcode into the client.

Each customer entered Passcode will be formed into an ISO Format-1 PIN block and encrypted with the mobileATM™ Working Key (WK) prior to transportation to the mobileATM™ server.

Following five consecutive incorrect Passcode entry attempts the mobileATM™ account for this customer will be locked. To gain access to the service the customer must request a new random key which is posted to their home address.

The mobileATM™ server uses a Thales RG8000 HSM (High Security Module—which is a standard banking security component) to verify the encrypted customer entered Passcode against the offset value stored in the mobileATM™ database.

Figure 10:
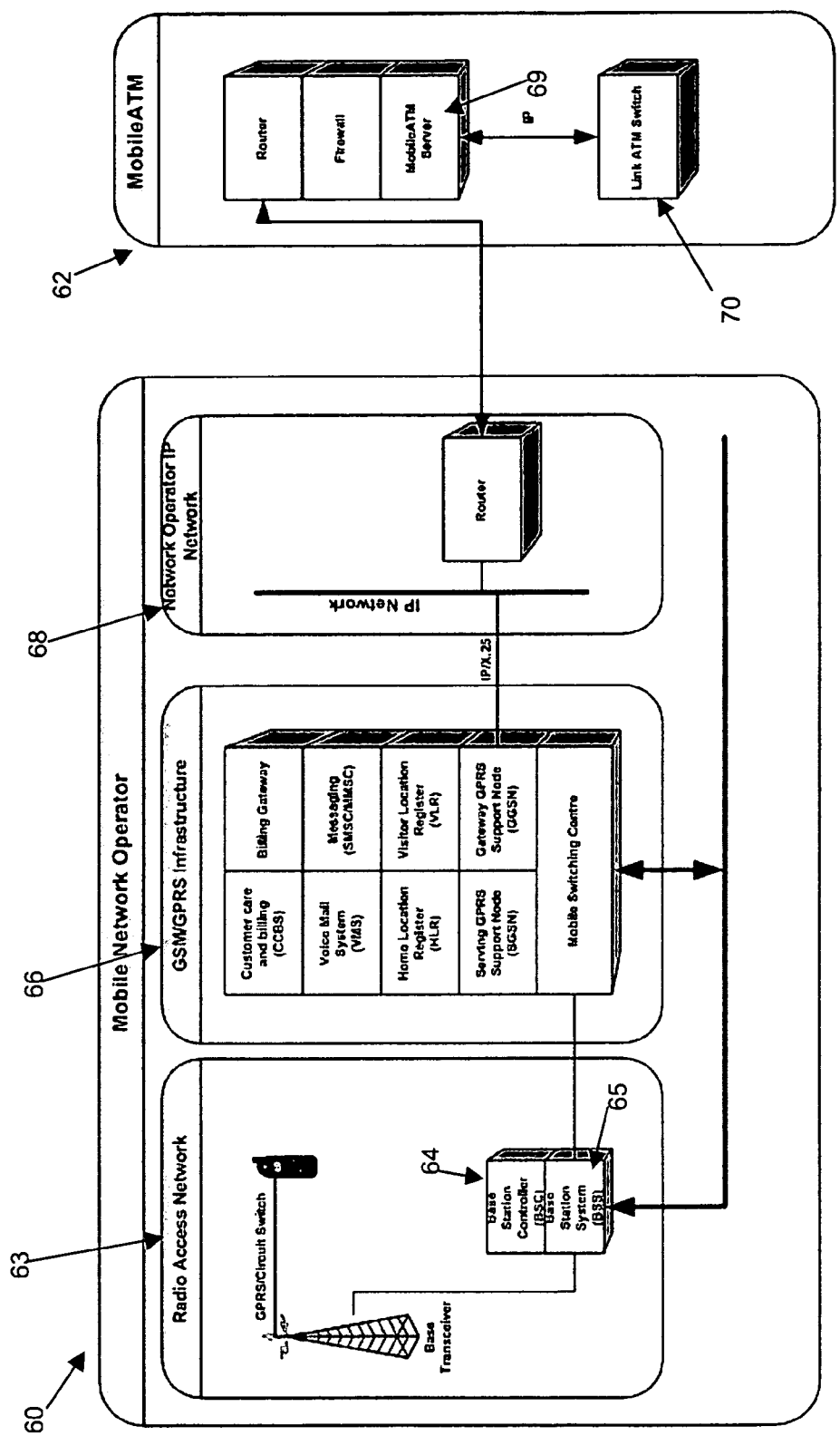
FIG. 10 shows a network view of the system of the invention.

An overview of the network connectivity for the mobileATM™ service is given in FIG. 10. The mobile network operator is shown as 60 and the MobileATM system is shown as 62.

FIG. 10 shows the radio access network 63, comprising a base transceiver in communication with a mobile device, and the base station controller 64 and base station system 65.

The GSM/GPRS infrastructure is shown as 66 which communicates with the network operator IP network 68. The network 68 communicates with the MobileATM system 62, which comprises a router, firewall, and the server 69, with the server 69 communicating with the LINK ATM switch 70 over an IP connection.

The description above has concentrated on the use of the system to enable mobile phone top-up and balance enquiries to be performed using a mobile telephone. The system of the invention also has wider possible implications on e-commerce generally. Advances in communication technology have led to a dramatic increase in the number and range of devices that are Internet-connected or Internet-enabled. These devices range from personal computers through to games consoles, mobile phones and television set-top boxes. It is widely recognised that a major evolution in the way we trade has begun as a result of the Internet, but there are still a number of vital components missing in the model to enable electronic commerce to further evolve. The most critical evolutionary stage towards frictionless commerce is the transition from the current restricted, insecure and unsafe trading environment to a safe and secure trading environment open to all.

The most crucial catalysts to begin this evolutionary stage in electronic commerce include (1) the ability to represent money; (2) the ability to associate with this representation an individuals identity and; (3) the ability to transact using these components in a secure and viable way within all of the electronic trading environments irrespective of connecting device or service provider.

In physical commerce, identity management is crucial. Identity management is relevant not only for identity verification in e-commerce but also impacts on national taxation systems.

The system of the invention can be used to enable electronic commerce to evolve further, by enabling the creation of technology products and services which extend the current physical mechanisms and represent these in the electronic world. By creating viable mechanisms to simply represent an extension of the current and accepted mechanisms for money and identity, the system is applicable to every country. More specifically, by providing a mechanism that can enable electronic commerce to evolve to a safe and secure trading environment open to all without disrupting the existing mechanisms, procedures or legislation in place to control national currencies and ultimately national economies.

The system of the invention can be extended to provide an enabling technology to create viable electronic money representations for physical commerce. This effectively enables the stakeholders in physical commerce to realise dramatic operational cost savings of electronic money.

Figure 11:
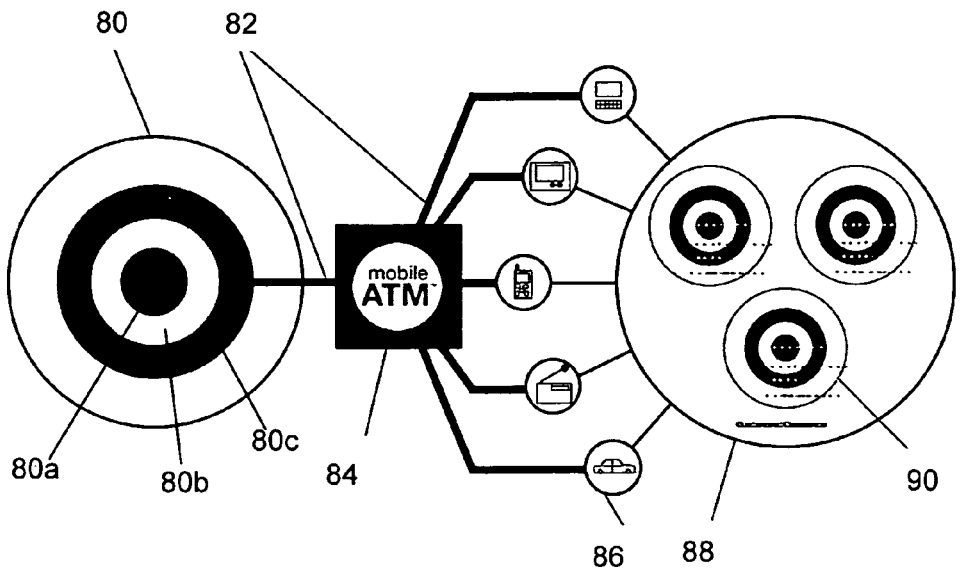
FIG. 11 shows a more general high level overview of the system of the invention to illustrate further applications.

FIG. 11 shows a more general high level overview of the system of the invention (mobileATM™) and how the invention fits in with both physical and electronic commerce.

The area 80 is a model of the physical trading environment, with the government 80a at its centre, followed by the central bank 80b and the retail bank industry 80c. This structure provides the foundation for physical commerce to thrive. The system of the invention is shown as 84 and is an interface between the retail bank industry 80c and potential devices 86 used to connect to the electronic commerce environment. These include, but are not limited to, the personal computer or games console, television set-top box, mobile phone or personal entertainment device, digital radio receiver and in-car entertainment and information systems.

Secure communication links 82 are utilised, with the connections to devices being either direct or indirect.

The mobileATM™ services represented by 84 encompass the device presentation, transaction business logic and enterprise integration components necessary to fulfil the cross bank, cross operator, cross handset requirements explained above and which give the system a mass adoption appeal.

Area 88 is a model of the electronic commerce environment. This will evolve into a series of marketplaces giving access to an ever evolving product and service set through the capabilities of a service provider.

These various marketplaces 90 require the necessary controls, measures etc required by nation states (for example the ability to impose a viable tax regime on their citizens generating revenue via the electronic channel and obviously for the citizen themselves to have that opportunity).

It can be seen that for consumers, the service provides them real time access to teller services over any appropriate channel via a simple implementation of the Automatic Teller Machine (ATM) user interface metaphor.

For merchants it provides the foundation for a secure and safe trading environment; these being viable representations of money and identity. Access to these representations will enable a myriad of business models to be created necessary to support any vibrant commerce environment, and far beyond the examples given above. The system thus provides mechanisms to compliment the more traditional subscription model with viable small value payments.

For retail banks, the system provides a standard mechanism for them to extend their services securely over a range of channels. Since the service utilises existing interfaces, in essence acting simply as ATM or POS joining an existing secure network, the cost of extending and expanding the customer services that they offer is dramatically reduced. It also provides the framework for the retail bank industry to begin to realise the operational cost savings resulting in the inevitable move to electronic money.

For governments it provides a number of standard mechanisms for enabling the further evolution of commerce. These standard mechanisms designed specifically to adhere to the well evolved processes, systems and legislation necessary in controlling a national currency. These mechanisms also provide a framework that can ultimately lead to new opportunities being created in an environment open to all. The system has the flexibility to provide a mechanism that enables national governments to evolve their tax regime in light of the changing commerce environment. Furthermore, the ability is provided to utilise the suite of products and service to provide an efficient automated tax collection agent for the future 'pay-per-use' tax models (such as the congestion charge tax imposed for driving into the centre of London).

Thus, it can be seen that the system of the invention, by providing a secure e-commerce environment, provides benefits which extend beyond those outlined above in the detailed description of one implementation.

Figure 12:
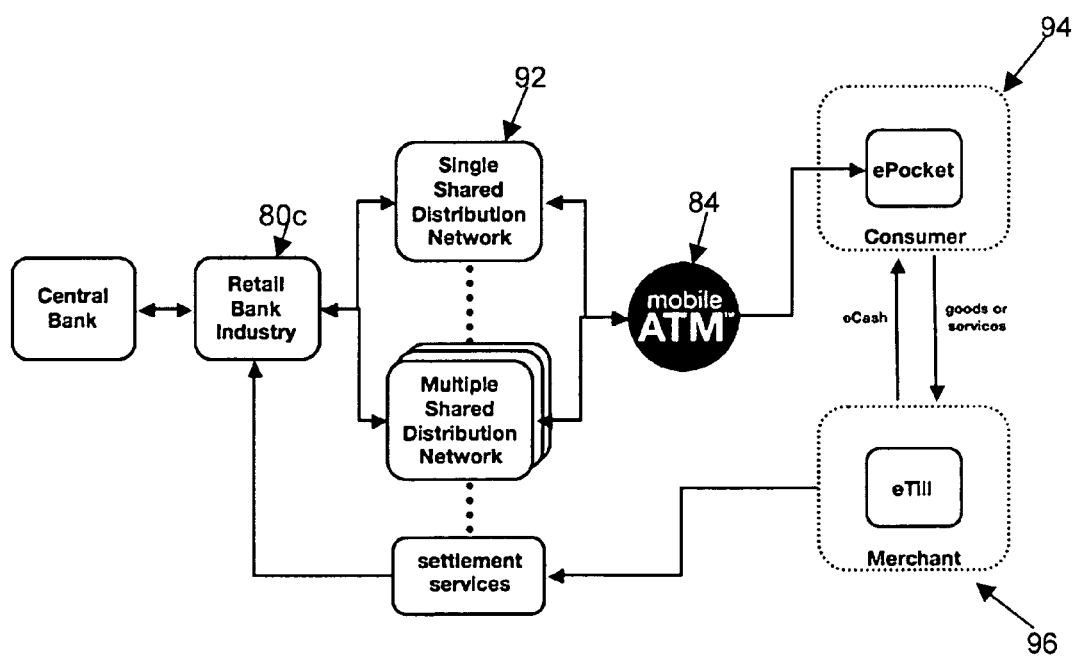
FIG. 12 shows how the system of the invention interfaces between the retail bank industry and the consumer for these further applications.

On a more general level, the invention enables a viable representation of money and identity. It can be seen in FIG. 12, therefore, that the service can be integrated into existing processes, controls and legislation necessary for a viable currency. FIG. 12 shows the system of the invention 84 interfacing between the retail bank industry 80c (by means of the intermediary 92 such as Link) and the consumer, in particular a so-called epocket 94 (an electronic wallet) of the consumer. This electronic wallet is used for transactions by electronic communications with a so-called eTill 96 of a merchant.

The mobileATM™ service can be integrated with existing banking systems and therefore appropriate for every country having either a single ATM/POS transaction switch, or multiple ATM/POS transaction switches (as shown by interface 92 in FIG. 12) or finally countries with no shared transaction facilities.

As mentioned above, the number of services which can be implemented by the system far exceed the specific examples described (of mobile phone top-up and balance enquiry). The system in fact is compatible with three types of transaction patterns: Security transaction services; Information transaction services; and Financial transaction services.

These transactions can then be installed into the service and made available when a consumer accesses the service. Not only does this provide a secure, accessible and easy to use service for consumers but provides a flexible foundation to incorporate the business requirements from the retail bank industry and mobile operator industry.

The reduced examples of service described above may be used at launch to reduce the complexity for consumers and give them access to low threatening services. Other transaction services are possible and are discussed further below.

For Security transaction services, the mobileATM™ service described above is a true two-factor authentication system. The mobileATM™ customer is only granted permission to use the service where they can prove that they (a) are in possession of the registered mobile handset; (b) they are in possession of the bank card; and (c) know the associated mobileATM™ passcode. It can be seen, therefore, that the mobileATM™ security model replicates and extends that of the ATM; using something the customer has in their possession (their mobile phone and their bank card), and something the customer knows, their PIN.

As such, the service can be used as an authentication service for retail banks for a number of electronic transactions when the customer is remote from the branch. One such service is an authentication service to provide online bank credential service or provide further verification for an online bank transaction.

The majority of retail banks in the UK offer consumers an internet channel to manage their accounts and access to this channel usually includes a registration process. The registration process includes the generation of user credentials by the retail bank and delivery of these credentials by post to the consumer's home address. Once received a consumer can use these credentials to logon to their internet bank via the browser installed on their internet connected PC.

This model for access control raises two issues. One is management of the user credentials by the retail bank, and the other relates to the ability to maliciously gain access to a consumer's internet bank credentials.

Retail bank customers have many credentials to remember, without writing down, such as ATM PINs, credit and debit card PINs and internet credentials add to the problem for the retail banking industry in efficiently managing the range of credentials required. As the number of credentials increases, it follows that the operating costs for the customer management team increases, for example increased calls into call centres as a result of lost or forgotten credentials and in response to a fraudulent attack on a consumers account.

It is well understood by the Information Technology industry that the PC environment is prone to malicious attacks and this problem is increasing as the number of internet-connected homes increases. The Association of Payment Clearing Services (APACS) have identified a number of methods used by fraudsters that severely affect retail banks that offer online services including:

Phishing Attacks—the sending of emails at random that appear to come from a genuine company.

Trojan Horses—a type of computer virus that is maliciously installed on a consumers PC without their knowledge.

Money Mules—a money transfer agent that is used to launder money.

The purpose of a phishing attack is to collect online bank credentials from consumers by sending emails that purport to be sent by a genuine company and then use the collected credentials to defraud a consumer. In a similar way, Trojan Horses are designed to collect online bank credentials by collecting keystroke information as the user enters their online credentials and automatically transmitting these credentials to be used to defraud a consumer. Money Mules arise from phishing and Trojan horse attacks by lulling consumers to act as a money laundering agent by accepting deposits into their account, withdrawing the funds and transferring the funds overseas via wire transfer.

It is evident that these attacks rely on consumers' online bank credentials remaining constant and although some banks only request elements of the password to be entered, which change at every logon, it is still possible using these attacks to gain access to consumers credentials. A possible solution, offered by some retail banks, is to supply customers with equipment that generates onetime passwords such as the RSA SecurID product, but the cost associated with this method is prohibitive.

The mobileATM service supports the secure delivery of sensitive information between service provider and customer. The service supports the secure delivery of online bank passwords and the secure delivery of transaction confirmation details (so that the service enables PIN concurred Internet transactions).

Secure Delivery of Online One-Time Passwords

The mobileATM service can support the secure delivery of onetime passwords and therefore reduce the ability for fraudsters to gain access to a consumer's credentials since using this method a consumer's password changes at each logon and is only valid for a limited period of time. Not only can the mobileATM service enable the delivery of the online password but the online password is encrypted from end-to-end and therefore further reduces the ability for man-in-the-middle attacks since the password is never in the clear except for when the password is decrypted on the users handset.

FIG. 13 is shows the steps involved in using the system with a onetime password facility. FIG. 13A shows steps 1 to 5 and FIG. 13B shows steps 6 to 9. FIG. 13 shows the interaction as viewed at a mobile telephone screen, and thus shows a battery level indicator and a signal strength meter.

In step 1, the user locates the mobileATM application from their phone menu and executes the application.

In step 2, the user enters their mobileATM passcode (it is noted that this may change to enter their ATM PIN after choosing the relevant account).

In step 3 ("sending") the passcode or PIN is encrypted and securely transmitted over to the mobileATM transaction server for authentication.

In step 4, ("receiving") the authentication result is transmitted back to the customer's handset.

In step 5, a list of registered accounts is displayed and the customer navigates and chooses the relevant account.

Figure 13A:
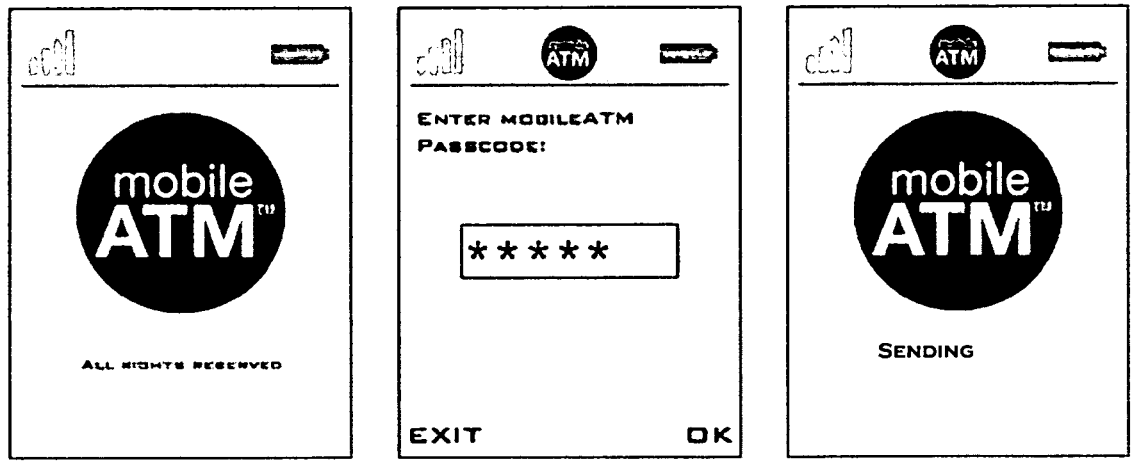
FIGS. 13A and 13B show the steps involved in using the system and is used to explain in further detail the security aspects of the system.
Figure 13A:
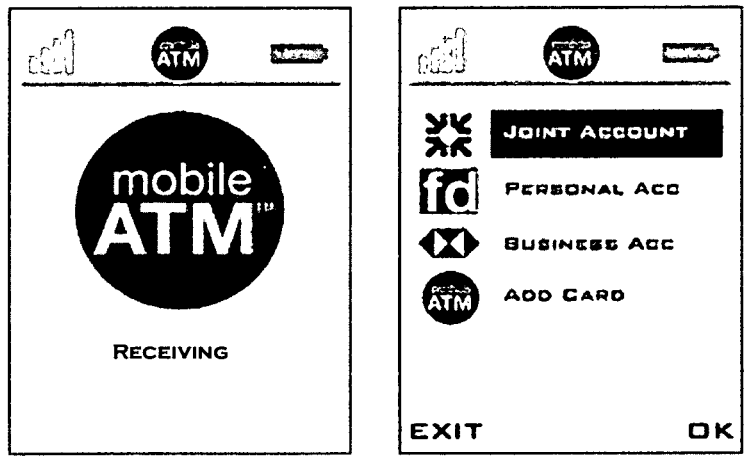
Figure 13B:
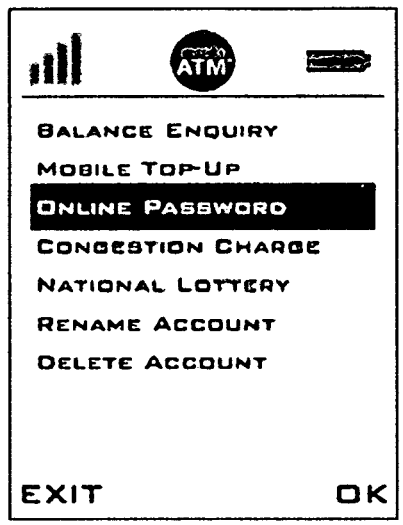
Figure 13B:
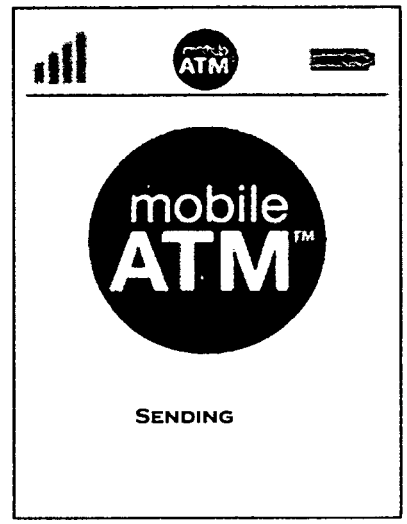
Figure 13B:
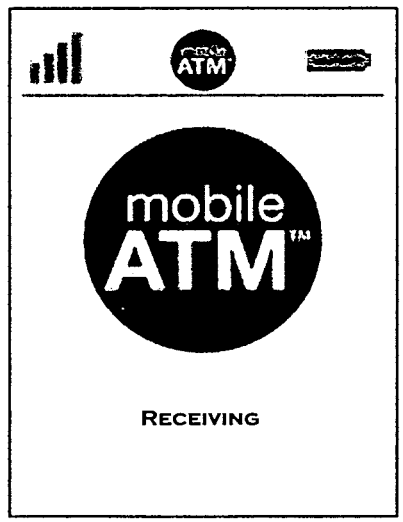
Figure 13B:

FIG. 13A thus shows the initial logon process. FIG. 13B is used to illustrate the steps when for a user to obtain a onetime password.

In step 6, a list of valid transactions against the chosen account is displayed and the user navigates to the online bank password transaction option.

In step 7, the request is securely transmitted ("sending") to the mobileATM transaction server for processing.

In step 8, the transaction result is securely transmitted to the consumer's handset ("receiving").

Finally, in step 9, the code is decrypted and displayed on the handset screen.

To logon to their online bank, the user then enter their login name and enter the onetime password delivered to their mobileATM client.

By providing a mechanism that requires customers to PIN-concur a request for a onetime, time-limited password to control access to online banking facilities the mobileATM service reduces the possibility for fraudsters to gain access to a consumer's online bank credentials. More specifically the possibility of phishing attacks and Trojan horse will be reduced since the password provided will be a onetime password with a time limit of usage.

By reducing the number of credentials required by customers, the service also enables the retail banking industry to reduce the operational costs associated with managing their online branch estate. In a similar way to the initial introduction of ATMs led to the reduction in the operating costs of managing the high street branch network, it follows that the mobileATM online bank credential service can lead to a reduction in the calls to retail bank call centres reducing the costs associated with generating credentials as a result of a consumer forgetting their credentials or as a result of fraudulent access.

Secure Delivery of Transaction Confirmation Details

The current way in which Internet payments are handled usually requires the user to enter their card details to the merchants web site. Although it is recognised that secure transmission links are used to transmit the card details to the merchants site, the merchant stores the card details. This in effect creates a virtual copy of the consumer's card and is subject to fraudsters. Card fraud for transactions in the physical world is continually addressed by modifications in the mechanisms used. This has resulted in the introduction of the chip and pin scheme which has a dramatic effect on fraud. The secure delivery of transaction confirmation brings these levels of security and identity verification to Internet transactions.

Using the service, a customer is not required to enter their card details into the merchants web site. Rather, the customer would enter an identification token (such as the customers mobile telephone number) and this would be used by the merchant to create a transaction. The transaction would include the customers identification token (e.g. the mobile telephone number) together with the transaction details to the mobileATM system to request user confirmation.

Figure 14:
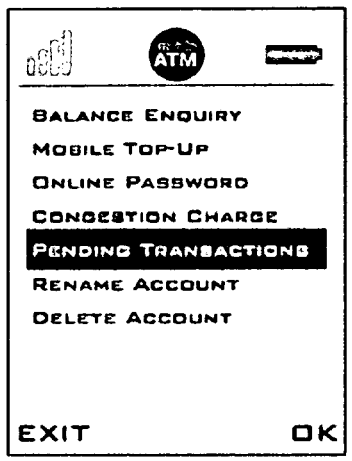
FIG. 14 shows an alternative to the steps of FIG. 13B for transaction verification.
Figure 14:
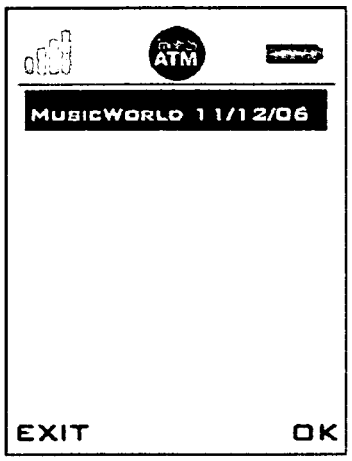
Figure 14:
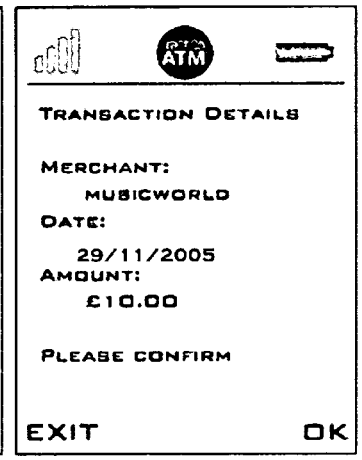
Figure 14:
Figure 14:
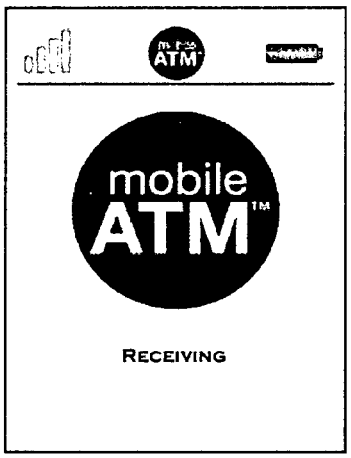
Figure 14:
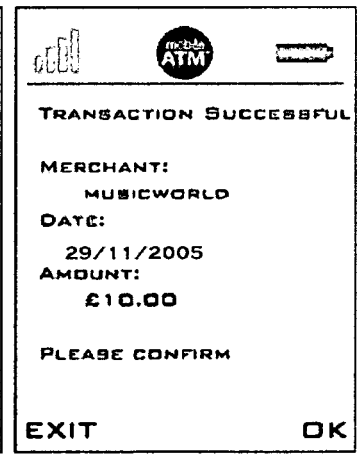

FIG. 14 shows how this process is operated. Steps 1 to 5 of FIG. 13A are again carried out as the initial logon process, so that the first screen shot of FIG. 14 is the same as that of FIG. 13B.

In step 6 of FIG. 14, the customer this time selects a menu option "pending transaction" for the account previously selected in step 5.

In step 7, a list of pending transactions for user confirmation is displayed, and to confirm a transaction the user navigates to the relevant transaction.

In step 8, the transaction details are displayed for user confirmation.

Once confirmed the transaction is securely transmitted to the mobileATM server for processing in step 9. Processing includes routing the transaction to a payment gateway confirmation of the Internet transaction including confirmation to the merchant.

The transaction result is encoded and securely transmitted to the users handset in step 10, and the transaction result is then displayed on the handset display screen in step 11.

These examples thus show the versatility of the system to perform many different functions, and illustrate some of the additional security features that can be built in to the system.

The system uses an intermediary acting as a gateway to banking records of multiple banking organisations. This avoids the need for direct communication between the user and any individual banking organisation. In this way, a single system can be established which functions for any bank, any operator and any handset. The user communication is all between the user and the intermediary, and in the system of the invention, this two way communication is through the MobileATM system. The system has the same appearance and function to the user regardless of their personal bank.

The protocols for the communication between the user and the intermediary can be defined independently of the protocols for the communication between the intermediary and the multiple banking organisations. The intermediary, for example LINK, then translates between different protocols. For example, the PIN number associated with an account can be encrypted by one method for the communication between the user and the intermediary, and the verification of this PIN number with the relevant banking organisation can use a different encryption. Thus, the network intermediary dictates the protocols for the communications between the user and the intermediary, whereas the banking organisations can determine the protocols for the communications between the intermediary and the banking organisations. These protocol conversions are of course hidden from the user.

One example of intermediary has been given, LINK, but different networks will exist in different countries. For the system to function most effectively, the intermediary preferably is associated with the individual banking organisations which cover at least one of the bank accounts of a significant number of private banking customers, for example at least one third, or more preferably at least half, and even more preferably at least two thirds of the private banking customers of the territory in question.

One preferred implementation of the system of the invention has been described in detail above, and only a small number of possible uses of the system. However, various other implementations will of course be possible, and these and other modifications will be apparent to those skilled in the art.

We claim:

1. An electronic system providing banking services, comprising:
    an intermediary adapted to act as a gateway to banking records of multiple banking organizations; and
    a server having:
    a first interface for communication with user mobile telephony devices over a mobile telephone network; and
    a second interface for communication with the intermediary
    wherein the first interface comprises:
        receiving means adapted to receive at least a balance enquiry request from a user mobile telephony device; and
        transmitting means adapted to provide a balance enquiry reply to a user mobile telephony device for display on the user mobile telephony device,
    and wherein the second interface comprises:
        transmitting means adapted to transmit a received balance enquiry request to the intermediary, for re-transmission by the intermediary to one of the multiple banking organizations; and
    receiving means adapted to receive a balance enquiry reply from the intermediary.

2. The system as claimed in claim 1, wherein the first interface is further adapted to enable peer-to-peer and peer-to-enterprise funds transfers requests to be submitted from a user mobile telephony device.

3. The system as claimed in claim 1, wherein the first interface is for communication with SIM card and Java mobile telephony devices.

4. The system as claimed in claim 1, wherein the first interface includes PIN Block 3DES encryption.

5. The system as claimed claim 1, further comprising a database storing MSISDNs and registered passcodes for the registered users of the system.

6. The system as claimed in claim 1, wherein the system implements a security verification process by verifying a user mobile telephony device identifier, a passcode set by the system, and a bank account identifier set by one of the multiple banking organizations.

7. The system as claimed in claim 6, wherein the system is further adapted to verify a bank account personal identification number agreed with one of the multiple banking organizations.

8. The system as claimed in claim 1, wherein the intermediary comprises a host of a network of automatic teller machines.

9. A method of providing a banking service, comprising:
    receiving a request for the banking service from a user operating a mobile telephony device by selecting options displayed on screen;
    processing the request and communicating with an intermediary acting as a gateway to banking records of multiple banking organizations including a banking organization of the user;
    communicating, via the intermediary, with a least one of the multiple banking organizations based on the request;
    generating a response in accordance with the request and communication with the at least one of the multiple banking organizations; and
    providing the response to the request over a mobile telephony network for display on the mobile telephony device.

10. The method as claimed in claim 9, further comprising, before allowing a user access to the banking service, implementing a registration procedure.

11. The method as claimed in claim 10, wherein the registration procedure takes account of the identity of the mobile telephony device, a passcode provided by the user and the address of the user.

12. The method as claimed in claim 9, wherein PIN Block 3DES encryption is used for the communication with the user.

13. The method as claimed in claim 9, wherein a transport security encryption system suitable for mobile communications is used for the communication with the user.

14. The method as claimed claim 9, wherein the banking service includes account balance enquiry.

15. An electronic system providing banking services, comprising:
    an intermediary adapted to act as a gateway to banking records of multiple banking organizations; and
    a server having:
    a first interface for communication with user mobile telephony devices over a mobile telephone network; and
    a second interface for communication with the intermediary wherein the first interface is adapted to allow at least balance enquiry requests to be submitted to one of the multiple banking organizations by means of the intermediary and to provide at least balance enquiry replies for display on the user mobile telephony device.

* * * * *